US012611620B2

(12) United States Patent
Mustakangas et al.

(10) Patent No.: US 12,611,620 B2
(45) Date of Patent: Apr. 28, 2026

(54) GRID AND A VAT FOR A FILTRATE VAT ASSEMBLY OF A VERTICAL FILTER PRESS

(71) Applicant: Metso Finland Oy, Espoo (FI)

(72) Inventors: Mirva Mustakangas, Pirkkala (FI); Ismo Juvonen, Rauha (FI); Janne Kaipainen, Halsua (FI); Teemu Eloranta, Luumäki (FI); Mika Illi, Vantaa (FI); Kari Vanttinen, Espoo (FI)

(73) Assignee: Metso Finland Oy, Espoo (FI)

( * ) Notice: Subject to any disclaimer, the term of this patent is extended or adjusted under 35 U.S.C. 154(b) by 494 days.

(21) Appl. No.: 18/246,428

(22) PCT Filed: Oct. 2, 2020

(86) PCT No.: PCT/FI2020/050650
§ 371 (c)(1),
(2) Date: Mar. 23, 2023

(87) PCT Pub. No.: WO2022/069789
PCT Pub. Date: Apr. 7, 2022

(65) Prior Publication Data
US 2023/0364531 A1     Nov. 16, 2023

(51) Int. Cl.
B01D 25/164 (2006.01)
B01D 25/127 (2006.01)
B01D 25/30 (2006.01)

(52) U.S. Cl.
CPC ......... B01D 25/305 (2013.01); B01D 25/127 (2013.01); B01D 25/164 (2013.01)

(58) Field of Classification Search
CPC ............ B01D 25/1275; B01D 25/1645; B01D 25/215; B01D 25/305
See application file for complete search history.

(56) References Cited

U.S. PATENT DOCUMENTS

| | | | |
|---|---|---|---|
| 3,240,344 | A | 3/1966 | Hoelscher |
| 5,938,920 | A | 8/1999 | Kearney et al. |

FOREIGN PATENT DOCUMENTS

| | | |
|---|---|---|
| CN | 203355412 U | 12/2013 |
| CN | 216778014 U | 6/2022 |

(Continued)

OTHER PUBLICATIONS

Search Report and Examination Report for ARIPO Patent Application No. AP/P/2023/014784, dated Mar. 6, 2025.

(Continued)

*Primary Examiner* — Bradley R Spies
(74) *Attorney, Agent, or Firm* — Andrus Intellectual Property Law, LLP

(57) ABSTRACT

A grid and a vat for a vat assembly of a vertical filter press such as a tower press is disclosed. The grid is provided with a topographical pattern engaging with a corresponding, inverse topographical pattern on the filtrate vat. The topographical patterns guide the filtrate flow towards a filtrate outlet and reduces the formation of vortices and turbulent flow of the filtrate, hence increasing the filtrate flow rate through the vat. Simultaneous, the topographical patterns improve secure attachment of the grid onto the vat, thereby allowing increased travel speed of the filter medium during advancement thereof. As a result, the cycle time of a filtration process may be reduced, and consequently, the overall capacity of the associated filter press is increased. A filtrate vat assembly and a vertical filter are also disclosed.

18 Claims, 4 Drawing Sheets

(56)     References Cited

FOREIGN PATENT DOCUMENTS

| | | | |
|---|---|---|---|
| DE | 1961417 | | 6/1971 |
| FR | 1511844 | A | 2/1968 |
| GB | 784231 | A | 10/1957 |
| WO | 9833573 | A1 | 8/1998 |
| WO | 03057344 | A1 | 7/2003 |

OTHER PUBLICATIONS

Office Action and Search Report for Chinese Patent Application No. 202111171008.0, issued Dec. 30, 2024.
International Search Report and Written Opinion for PCT/FI2020/050650, mailed Jan. 28, 2021.

GRID AND A VAT FOR A FILTRATE VAT ASSEMBLY OF A VERTICAL FILTER PRESS

CROSS-REFERENCE TO RELATED APPLICATIONS

This application is the U.S. national stage application of International Application PCT/FI2020/050650, filed Oct. 2, 2020, which international application was published Apr. 7, 2022, as International Publication WO 2022/069789 A1 in the English language.

FIELD OF THE DISCLOSURE

The present disclosure relates to vertical filter presses, such as tower presses, and more particularly to a grid and vat for a filtrate vat assembly of such a filter. The present disclosure further concerns the vat assembly and the vertical filter press.

BACKGROUND OF THE DISCLOSURE

In vertical filter presses multiple filter plates are super-imposed, such that a filter chamber is delimited between adjacent filter plates. A filter medium, typically a filter cloth, is positioned between adjacent filter plates. Slurry is fed into the filter chamber above the cloth, and filtrate is received through the filter medium into a filtrate vat formed on the filter plate below. A grid is provided in the filtrate vat so as to support the filter cloth and to prevent it from bulging into the filtrate vat. In order to remove the solid filter cake formed in the filter chamber, the filter plates are distanced away from each other and the filter medium is forwarded, thereby carrying the filter cake out of the filter chamber.

Typically, the slurry is introduced into the filter chamber at one or more distinct points, resulting in a non-uniform filtrate flow into the filtrate vat. Particularly, a major portion of the filtrate is received at a feed region of the filtrate vat, corresponding to the location of points where slurry is introduced into the filter chamber. Consequently, the filtrate flow within the filtrate vat typically forms vortices, resulting in turbulent flow, in turn, decreasing the flow rate at which filtrate can flow in and out of the vat.

Moreover, as the weight of the filter medium and the filter cake lies on the grid, the grid must be sufficiently secured in place so as to withstand the forces exerted thereon by the filter medium dragging the grid along while being advanced. Failure to secure the grid properly may cause misplacement or misalignment thereof, resulting in an increased risk of damaging the filter medium itself. Partly for this reason, the speed at which the filter medium is advanced during dis-charge of the filter is restricted.

BRIEF DESCRIPTION OF THE DISCLOSURE

An object of the present disclosure is to provide a grid and a vat for a vat assembly of a vertical filter press such as a tower press, which contribute to increasing the overall capacity of the associated filter press. It is a further object of the present disclosure to provide a filtrate vat assembly incorporating such a grid and a filtrate vat, and a vertical filter press incorporating such a filtrate vat assembly.

The object of the disclosure is achieved by the grid, the filtrate vat, the filtrate vat assembly, and the vertical filter press, which are characterized by what is stated in the independent claims. The preferred embodiments of the dis-closure are disclosed in the dependent claims.

The disclosure is based on the idea of providing a surface of the grid facing the filtrate vat with a topographical pattern engaging with a corresponding, inverse topographical pat-tern on a surface of the filtrate vat facing the grid, such that the topographical patterns guide the filtrate flow towards a filtrate outlet of the filtrate vat.

An advantage of the solution according to the disclosure is that the topographical pattern reduces formation of vor-tices and turbulent flow of the filtrate in the filtrate vat, hence increasing the filtrate flow rate through the vat. Simultane-ous, the topographical patterns improve secure attachment of the grid onto the vat, thereby allowing increased travel speed of the filter medium during advancement thereof. As a result, the cycle time of a filtration process may be reduced, and consequently, the overall capacity of the asso-ciated filter press is increased.

According to a first aspect of the present disclosure, a grid for a filtrate vat assembly of a vertical filter press, such as a tower press, is provided.

The grid comprises a plate-like grid body having a first side and a second side. The first side defines a generally planar first surface for supporting a filter cloth, when in use. The second side defines a second surface comprising a plurality of protruding knobs spaced apart from each other for supporting the remaining grid on an associated filtrate vat at a distance therefrom. That is, the knobs are configured for supporting the remaining grid at a distance from a bottom of the receptacle defined by the vat, so as to enable filtrate flow between the grid and the vat. The first and second sides are arranged on opposing sides of the plate-like grid body. The body further comprises a plurality of apertures provid-ing fluid communication between the first surface and the second surface.

Moreover, the second surface comprises a grid topogra-phy for engaging with a corresponding, inverted vat topog-raphy of an associated filtrate vat. That is, a protrusion of the grid topography is suitable to be received by a recess of the vat topography, or a protrusion of the vat topography is suitable to be received by a recess of the grid topography, so as to laterally secure the grid with the vat. The grid topog-raphy forms a topographical pattern running along an intended filtrate flow path of an associated filtrate vat at the position of the grid.

In the context of this disclosure, the term topography is used to describe the relief of a surface, i.e., the form and shape formed by the differences in the elevation of a surface.

The topographical pattern reduces the formation whirls or vortices in the filtrate vat, which makes the filtrate flow thereat less turbulent. As a result, drainage of the filtrate from the filtrate vat is faster. Moreover, the topographical pattern helps secure the grid in place within the filtrate vat. Consequently, the grid is able to better resist movement caused by a filter medium being advanced thereon. As a result, the speed at which the filter medium is advanced may be increased. As the filtrate drainage is improved and the filter medium may be advanced faster, the time required for the filtration step and the filter cake discharge step, respec-tively, is reduced, and the overall efficiency of the associated filter is improved. In other words, the solutions according to the present disclosure provides for more slurry to be filtered in a given time.

In an embodiment according of the first aspect of the present disclosure, the grid topography may comprise a plurality of recesses for receiving a corresponding vat topog-raphy of an associated filtrate vat comprising a plurality of protuberances. In such a case, the plurality of recesses forms a recessed pattern running along an intended filtrate flow path of an associated filtrate vat at the position of the grid. For example, the recessed topographical grid pattern may be provided as one or more grooves, suitably running along the intended flow path.

Such an arrangement is considered particularly advantageous, as providing a recessed topographical pattern in the vat might result in solids depositing in such recesses over time, thereby preventing the protuberant grid pattern form being properly received within the recess.

In an embodiment according of the first aspect of the present disclosure, the grid topography may comprise a plurality of protuberances for being received by a corresponding vat topography of an associated filtrate vat comprising plurality of recesses. In such a case the plurality of protuberances forms a protuberant pattern running along an intended filtrate flow path of an associated filtrate vat at the position of the grid. For example, the protuberant topographical grid pattern may be provided as one or more beads, suitably running along the intended flow path.

In an embodiment according of the first aspect of the present disclosure, the grid body may have a generally rectangular shape having a first set of opposing parallel lateral sides and a second set of opposing parallel lateral sides, such that the first set of lateral sides is perpendicular with respect to the second set of lateral sides.

Such a generally rectangular grid facilitates laying a plurality of grids so as to cover the whole area filtrate vat. For example, a combination of grids having two or more different topographical patterns may be used to follow a complex intended flow route. However, it should be noted that the grids may also be provided in other alternative shapes.

For example, the grid topographical pattern may extend between opposing lateral sides of the grid, preferably along a linear path.

Alternatively, the grid topographical pattern may extend between adjacent lateral sides of the grid, preferably along a curved path. Particularly, such an arrangement results in the grid topographical pattern having a component extending transverse to the direction in which a filter medium is advanced during filter cake discharge, regardless of the orientation of the grid on the filtrate vat.

It should be noted that the first aspect of the present disclosure encompasses any combination of two or more embodiments, or variants thereof, as discussed above.

According to a second aspect of the present disclosure, a filtrate vat for a filtrate vat assembly of a vertical filter press, such as a tower press, is provided.

The filtrate vat has a vat body, comprising a plate side with a bottom surface at which the filtrate vat is supportable on a filter plate. The vat body further comprises a grid side opposite to the plate side.

A vat surface is arranged on the grid side, the vat surface defining a bottom of a receptacle for receiving filtrate attainable from a filtration process of an associated vertical filter press, and for receiving an associated grid to be supported thereon. Also, at least partly surrounding the vat surface, a border is arranged on the grid side, the border defining a lateral wall of the receptacle.

The filtrate vat further comprises a filtrate outlet opening for providing a discharge route for filtrate from the filtrate vat, through the border.

Moreover, the vat surface comprises a vat topography for engaging with a corresponding, inverted grid topography of an associated grid in a similar manner as discussed in connection with a grid according to the first aspect of the present disclosure. The vat topography forms a topographical pattern running along an intended filtrate flow path between a feed region of the vat surface and the filtrate outlet opening.

In the context of this disclosure, the term feed region is used to describe a region on the vat surface at which an increased filtrate flow rate into the vat is exhibited. In practise, this region often corresponds to the position(s) of slurry feed opening(s) of an associated filter chamber positioned above the filtrate vat, when in use. Typically, such a feed region is arranged on a central region of the vat surface. For example, the feed region may be considered to extend from a geometrical centre of the vat surface in a longitudinal direction for a distance corresponding to $\frac{1}{4}$ of the longitudinal length of the vat surface towards each longitudinal end. Moreover, the feed region may be considered to extend a in transverse direction all the way to each transverse end. Alternatively, the feed region may be considered to extend from a geometrical centre of the vat surface in the transverse direction also for a distance corresponding to $\frac{1}{4}$ of the transverse length of the vats surface towards each transvers end.

As with the grid according to the first aspect of the present disclosure, the topographical pattern reduces the formation whirls or vortices in the filtrate vat, which makes the filtrate flow threat less turbulent. As a result, drainage of the filtrate from the filtrate vat is faster. Moreover, the topographical pattern helps secure the grid in place within the filtrate vat. Consequently, the grid is able to better resist movement caused by a filter medium being advanced thereon. As a result, the speed at which the filter medium is advanced may be increased. As the filtrate drainage is improved and the filter medium may be advanced faster, the time required for the filtration step and the filter cake discharge step, respectively, is reduced, and the overall efficiency of the associated filter is improved. In other words, the solutions according to the present disclosure provides for more slurry to be filtered in a given time.

In an embodiment according of the second aspect of the present disclosure, the vat topography comprises a plurality of protuberances for being received by a corresponding grid topography comprising a plurality of recesses. In such case, the plurality of protuberances forms a protuberant pattern running along the intended filtrate flow path. For example, the protuberant vat topographical pattern may be provided as one or more beads, suitably running along the intended flow path.

In an embodiment according of the second aspect of the present disclosure, the vat topography comprises a plurality of recesses for receiving a corresponding grid topography comprising a plurality of protuberances. The plurality of recesses forms a recessed pattern running along the intended filtrate flow path. For example, the recessed topographical vat pattern may be provided as one or more grooves, suitably running along the intended flow path.

In an embodiment according of the second aspect of the present disclosure, the vat body is of a generally rectangular shape having opposing parallel flanks sides running along an longitudinal direction of the vat, and opposing parallel end sides, such that the flank sides are perpendicular to the end sides. That is the length of the flank sides is longer than the end sides.

In such a case, the filtrate outlet is provided at a corner region between adjacent flank and end sides. Moreover, the topographical pattern suitably runs parallel with the flank sides in between the feed region and the filtrate outlet.

In an embodiment according of the second aspect of the present disclosure, the vat topographical pattern runs inclined to the flank sides at the feed region of the vat surface.

In an embodiment according of the second aspect of the present disclosure, the vat topographical pattern runs inclined to the flank sides at a corner region having an outlet.

In an embodiment according of the second aspect of the present disclosure, the vat is provided as a vat liner having a material thickness of less than 15 mm. That is, the primary structural rigidity of the vat and the receptacle formed by it is formed by a separate entity from the vat liner, (such as the filter plate itself), whereas the vat liner merely lines or covers the shape of the vat, thereby separating it from contact with the filtrate and/or other process fluids. Particularly in such a case, it is advantageous to provide the vat topography as a plurality of protuberances, as the material strength would restrict the depth of recesses.

It should be noted that the second aspect of the present disclosure encompasses any combination of two or more embodiments, or variants thereof, as discussed above.

According to a third aspect of the present disclosure, a filtrate vat assembly for a vertical filter press, such as a tower press, is provided.

The filtrate vat assembly comprises a grid according to the first aspect of the present disclosure, as discussed above, and a filtrate vat according to the second aspect of the present disclosure, as discussed above.

Particularly, the grid is received within the receptacle of the vat such that the second surface of the grid is facing and supported by the vat surface of the filtrate vat, and such that the grid is laterally delimited by the border. Moreover, the grid is positioned and aligned such that the grid topography and the vat topography mutually engage each other.

According to an embodiment of the third aspect of the present disclosure, the filtrate vat is of a generally rectangular shape having a filtrate outlet at a corner region and a topographical pattern running parallel with the flank sides between the feed region and the filtrate outlet, as discussed in more detail in connection with the second aspect of the present disclosure. In such a case, at least a grid of the type with a grid topographical pattern extending between opposing lateral sides thereof, as discussed in more detail in connection with the first aspect of the present disclosure, may be provided between the feed region and the filtrate outlet.

According to an embodiment of the third aspect of the present disclosure, the filtrate vat is of a type having a topographical pattern running inclined to the flank sides at the feed region of the vat surface. In such a case, at least a grid of the type with a grid topographical pattern extending between adjacent lateral sides thereof, as discussed in more detail in connection with the first aspect of the present disclosure, may be provided at the feed region According to an embodiment of the third aspect of the present disclosure, the filtrate vat is of a type having a topographical pattern running inclined to the flank sides at a corner region having an outlet. In such a case, at least a grid of the type with a grid topographical pattern extending between adjacent lateral sides thereof, as discussed in more detail in connection with the first aspect of the present disclosure, may be provided on the corner region having an outlet.

It should be noted that the third aspect of the present disclosure encompasses any combination of two or more embodiments, or variants thereof, as discussed above.

According to a fourth aspect of the present disclosure, a vertical filter press, such as a tower press, is provided.

The filter press comprises:

a plurality of superimposed filter plates. The superimposed filter plates are configured movable in a vertical direction away from each to an open position and towards each other to a closed position, such that a horizontal filter chamber is formed between adjacent filter plate assemblies in the closed position;

a filter medium arranged between adjacent filter plates a lifting device for lifting the filter plate assemblies away from each other and lowering the filter plate assemblies towards each other;

a sealing device for pressing the plurality of filter plate assemblies in the closed position against each other, so as to seal the filter chamber formed therebetween;

a feed arrangement for feeding slurry into the filter chamber;

a recovering arrangement for recovering filtrate from the filtrate outlets, and a discharge arrangement for moving the filter medium so as to discharge filter cakes formed within the filter chamber.

Moreover, a filtrate vat assembly according to the third aspect of the present disclosure is provided on, and supported by, one or more of the filter plates. Furthermore, a filter medium residing between a filter plate above and a filter plate below lies on a grid of a filtrate vat assembly supported by the filter plate below. During operation, the filtrate vat assembly of the filter plate below is configured to receive filtrate from an associated filter chamber through the filter medium.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1:
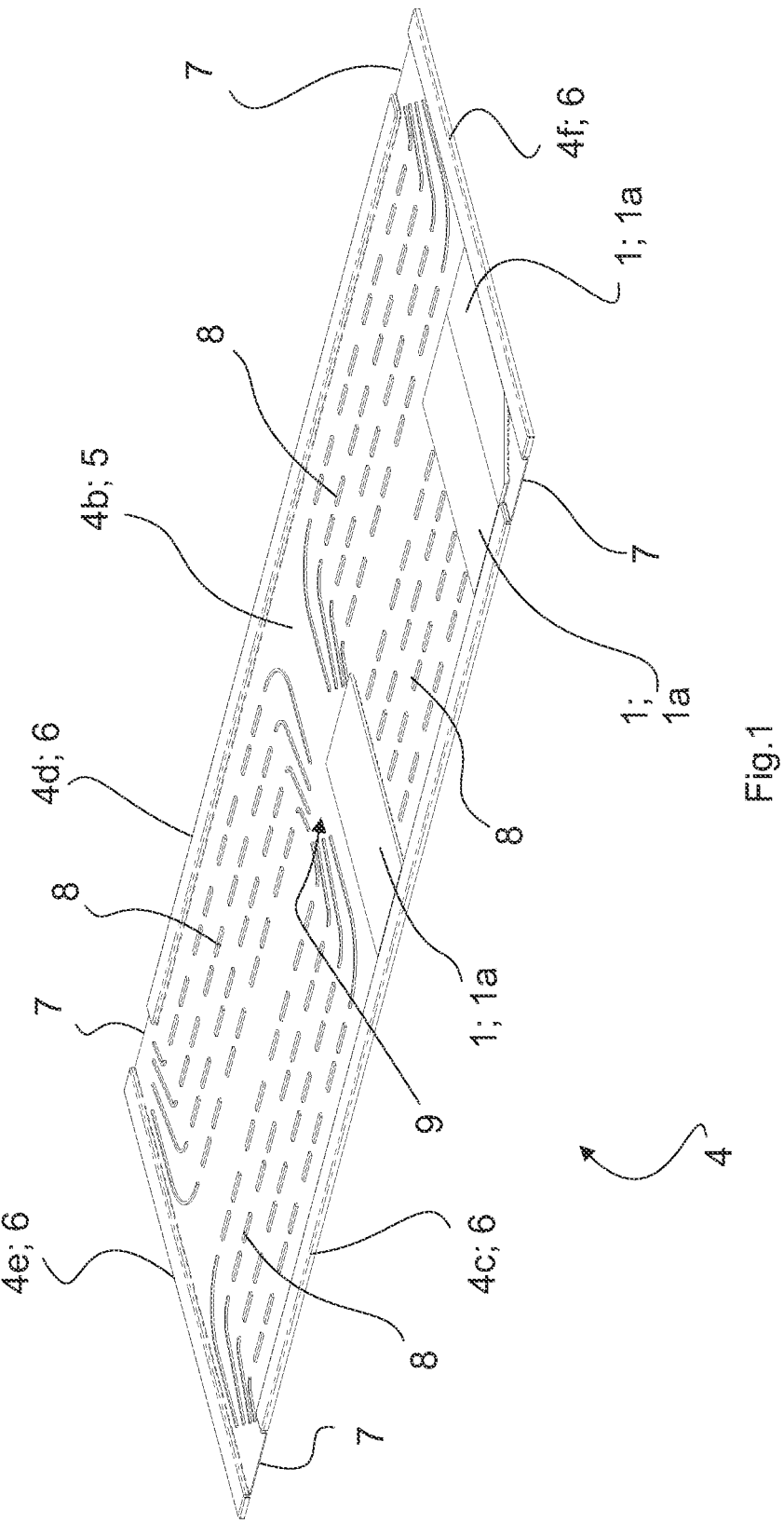
FIG. 1 illustrates a perspective view of a partial filtrate vat assembly according to an embodiment of the present disclosure.

FIG. 1 illustrates a perspective view of a partial filtrate vat assembly according to an embodiment of the present disclosure. Particularly, the vat assembly has a filtrate vat 4, in which three different types of grids 1 are received. It should be noted, that in operating condition, the bottoms surface 4b of the vat 4 covered by multiple additional grids, which are not shown in FIG. 1-FIG. 3 for the purpose of clarity.

Particularly, the vat 4 shown in FIG. 1 is formed as a vat liner, i.e. having a body of relatively thin material thickness intended to cover a separate entity (such a filter plate) which provides primary structural strength of the for the filtrate vat. Naturally, the filtrate vat may alternatively be provided as a more thick, self-supporting structure.

The filtrate vat 4 has a generally rectangular shape with a pair parallel opposing flank sides 4c and 4, and a pair of parallel opposing end sides 4e and 4f, where the end sides 4e, 4f are transverse to the flank sides 4c 4d.

The filtrate vat is intended to be supported on a filter plate at a plate side thereof (not illustrated). An opposing grid side 4b of the vat body has a vat surface 5 arranged thereon, defining a bottom of a receptacle formed by the filtrate vat 4. Particularly, the receptacle is configured for receiving filtrate from a filtration process of an associated filter press (i.e., from a filter chamber formed above the filtrate vat, when in use). A border 6 runs along the flank sides 4c, 4d and the end sides 4e, 4ef, and surrounds the vat surface 5 thereby defining a lateral wall of the receptacle, while filtrate openings 7 are arrange at the four corner regions of the filtrate vat 4 extending through the border 6 so as to provide discharge routes for the filtrate received within the receptacle.

The vat surface 5 exhibits a topographical pattern formed as a plurality of protuberances provided as beads extending along an intended flow path between the feed region (arranged at a central portion of the vat surface 5) and the outlet openings 7. Particularly, an intended flow path runs between each of the outlet openings 7 and the feed region 9.

The vat topographical patterns 8 are inclined with respect to the flank sides 4c, 4d at the feed region 9 and run along a curved path, so as to guide filtrate flow away from a transverse centre of the vat surface 5. The vat topographical patterns 8 then extends parallel with the flank sides 4c, 4d towards their respective outlet openings 7, so as to guide the filtrate flow towards the end sides 4e, 4f. Finally, at the corner regions having the outlet opening 7, the vat topographical patterns 8 then extends inclined with the flank sides 4c, 4d, along a curved path so as to guide filtrate flow into the outlet openings 7.

As mentioned, FIG. 1 illustrates three different types of grids 1 received within receptacle of filtrate vat and supported on the vat surface 5. Each of the grids have a plate-like body having a first side 1a with a planar surface on which a filter medium is to be supported, when in use, and second side (not illustrated) facing the vat surface 5, at which the grids 1 are supported on the filtrate vat. A plurality of apertures 2 (see FIG. 4a-4c) are provided for providing fluid communication between the first side 1a and the second side. Although not shown in the drawings, the second surface has a plurality of knobs for distancing the remaining grid 1 at a distance from the vat surface 5, so as to allow passage for the filtrate therebetween.

The second surface of each of the grids has a grid topography, which is inverted with respect to the vat topography of the vat surface 5 at the intended position of the grid 1 in question. That is, the grid topography forms a topographical pattern 3 also running along an intended filtrate flow path of an associated filtrate vat 4 at the position of the grid 1. Moreover, the grid topographical pattern 3 engages with the topographical pattern 8 of the vat surface 5. In the arrangement of the drawings, the protuberant vat topographical pattern 8 is received by the recessed grid topographical pattern 3.

Figure 2:
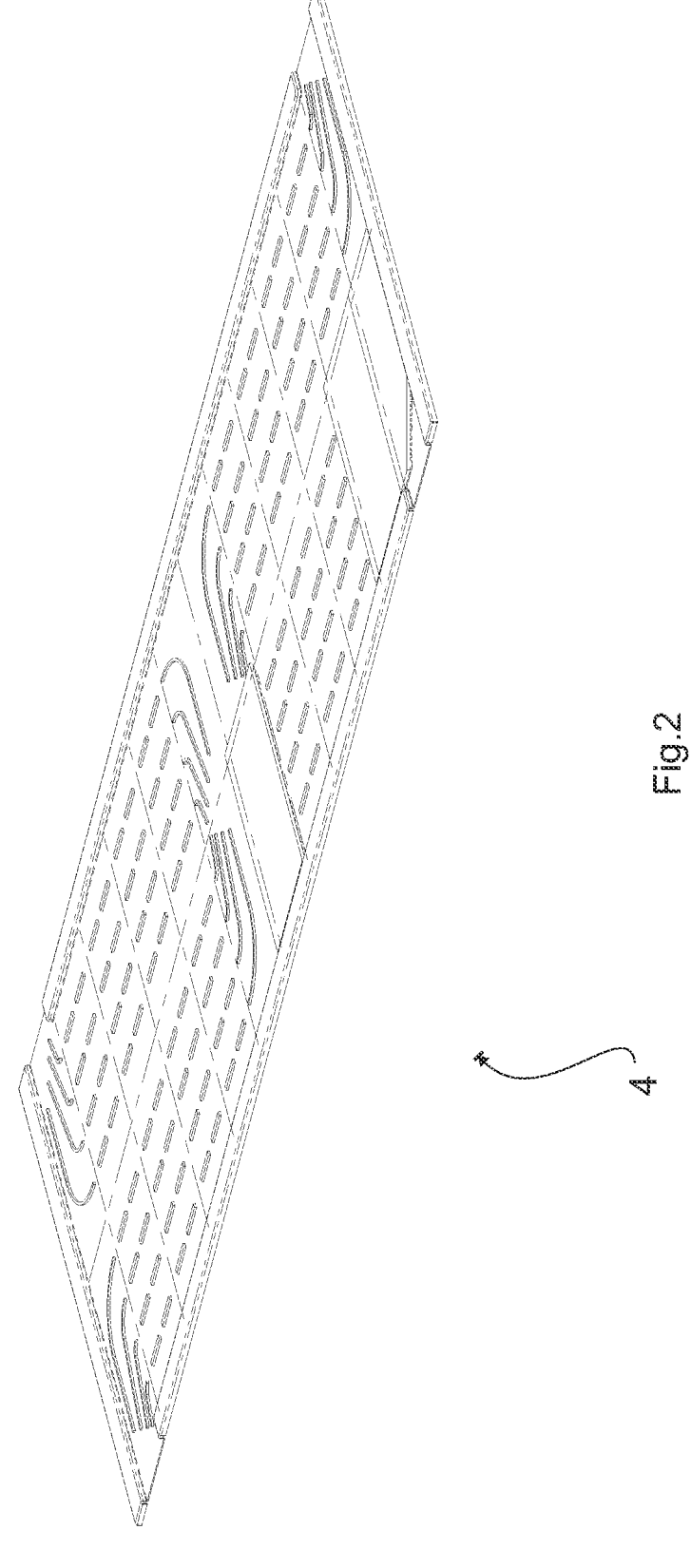
FIG. 2 illustrate the arrangement of FIG. 1 with additional markings showing grid positions.

FIG. 2 shows an identical arrangement to that of FIG. 1 with dot-dashed auxiliary lines illustrating intended positions of additional grids, which are not shown in the drawings.

Figure 3:
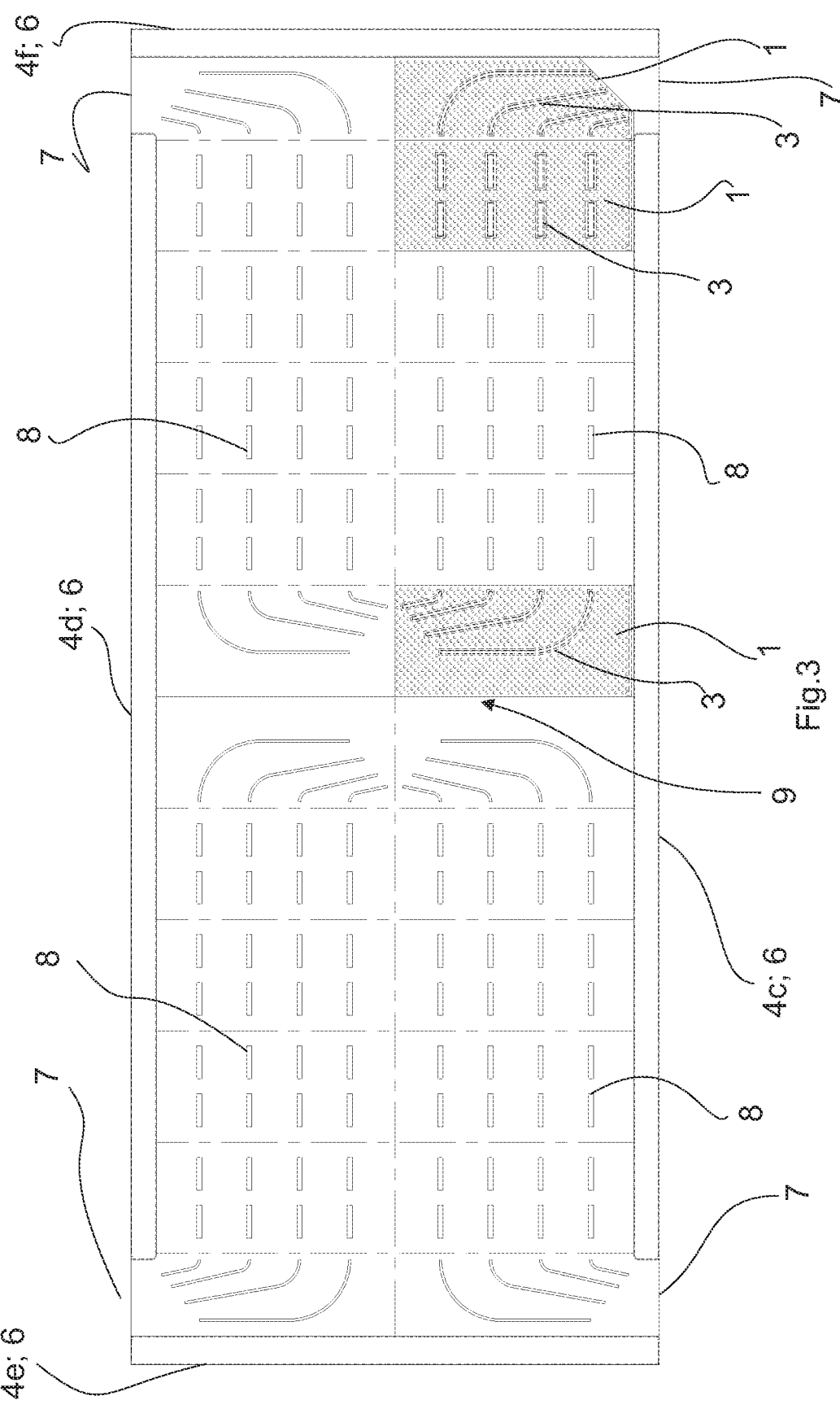
FIG. 3 illustrates the arrangement of FIG. 1 as seen as a plan view with additional markings showing grid positions.

FIG. 3, in turn, shows the arrangement of FIG. 1 as a plan view. The grid 1 positioned at the feed region 9 is illustrated in more detail in FIG. 4a. The grid positioned at the corner region with the outlet opening 7 is illustrated in more detail in FIG. 4c. The grid 1 illustrated between the feed region 9 and the outlet opening 7, in turn, is illustrated in more detail in FIG. 4b.

Figures 4A, 4B, 4C:
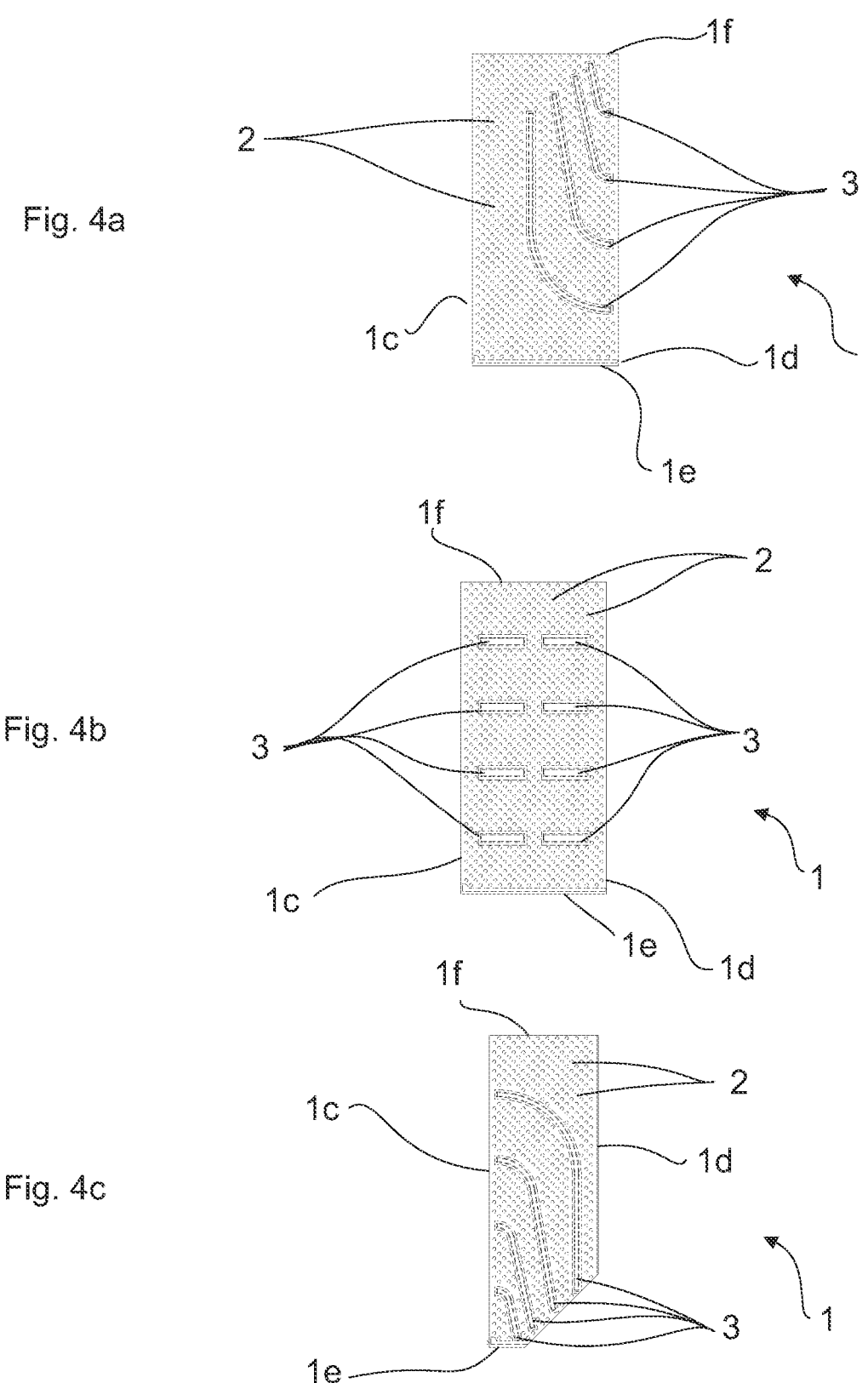
FIG. 4a-FIG. 4c illustrates various grids according different embodiments of the present disclosure, as seen aa plan views.

FIG. 4a illustrates a plan view of the grid 1, as seen from a first side 1a thereof. A plurality of apertures 2 extend through the first side 1a up to an opposing second side, thereby providing fluid communication therebetween. Although provided on the second side, a projection of the grid topographical pattern 3 on the first side 1a is illustrated with dashed lines. Particularly, the grid topographical pattern 3 extends between adjacent lateral sides 1d, 1f along a curved path. The grid of FIG. 4a is of a generally rectangular shape having a first set of opposing parallel lateral sides 1c, 1d and second set of opposing lateral sides 1e, 1f, such that the first and second set of sides are perpendicular to each other.

FIG. 4b illustrates a plan view of the grid 1 similar to that of FIG. 4a, with the exception of the grid topographical pattern 3 extending between opposing lateral sides 1c, 1d along a linear path.

FIG. 4c, in turn also illustrates a plan view of the grid 1 similar to that of FIG. 4a, with the exception of the grid topographical pattern 3 extending between adjacent lateral sides 1c, 1e along a curved path. In addition, the rid 1 of FIG. 4c also has a has a chamfer provided on between the sides 1e and 1d.

LIST OF REFERENCE NUMERALS 1 grid
1a first side
1c, 1d first set of parallel lateral sides
1e, 1f second set of parallel lateral sides
2 plurality of apertures 3
3 grid topographical pattern
4 filtrate vat
4a plate side
4b grid side
4c, 4d flank sides
4e, 4f end sides
5 vat surface
6 border
7 filtrate outlet opening
8 vat topographical pattern
9 feed region

The invention claimed is:

1. A grid for a filtrate vat assembly of a vertical filter press comprising a grid body having a first side and an opposing second side,
    wherein the first side defines a generally planar first surface for supporting a filter cloth, when in use,
    wherein the second side defines a second surface comprising a plurality of protruding knobs spaced apart from each other for supporting the remaining grid on an associated filtrate vat at a distance therefrom,
    wherein the grid body further comprises a plurality of apertures providing fluid communication between the first surface and the second surface,
    wherein the second surface comprises a grid topography for engaging with a corresponding, inverted vat topography of an associated filtrate vat, and
    wherein the grid topography forms a topographical pattern running along an intended filtrate flow path of an associated filtrate vat at the position of the grid.
2. The grid according to claim 1, wherein the grid topography comprises a plurality of recesses for receiving a corresponding vat topography of an associated filtrate vat comprising a plurality of protuberances, and wherein the plurality of recesses forms a recessed pattern running along an intended filtrate flow path of an associated filtrate vat at the position of the grid.

3. The grid according to claim 1, wherein the grid topography comprises a plurality of protuberances for being received by a corresponding vat topography of an associated filtrate vat comprising plurality of recesses, and wherein the plurality of protuberances forms a protuberant pattern running along an intended filtrate flow path of an associated filtrate vat at the position of the grid.

4. The grid according to claim 1 wherein the grid body has a generally rectangular shape having a first set of opposing parallel lateral sides and a second set of opposing parallel lateral sides, such that the first set of lateral sides is perpendicular with respect to the second set of lateral sides.

5. The grid according to claim 1 wherein the grid topographical pattern extends between opposing lateral sides of the grid, preferably along a linear path.

6. The grid according to claim 1 wherein the grid topographical pattern extends between adjacent lateral sides of the grid, preferably along a curved path.

7. A filtrate vat for a filtrate vat assembly of a vertical filter press having a vat body, comprising:

a plate side with a bottom surface at which the filtrate vat is supportable on a filter plate, and a grid side opposite to the plate side, having arranged thereon:

a vat surface defining a bottom of a receptacle for receiving filtrate attainable from a filtration process of an associated vertical filter press and for receiving an associated grid to be supported thereon, and at least partly surrounding the vat surface, a border defining a lateral wall of the receptacle, wherein the vat comprises a filtrate outlet opening for providing a discharge route for filtrate from the filtrate vat, through the border, wherein the vat surface comprises a vat topography for engaging with a corresponding, inverted grid topography of an associated grid, and wherein the vat topography forms a topographical pattern running along an intended filtrate flow path between a feed region of the vat surface and the filtrate outlet opening.

8. The filtrate vat according to claim 7, wherein the vat topography comprises a plurality of protuberances for being received by a corresponding grid topography of an associated grid comprising a plurality of recesses, and wherein the plurality of protuberances forms a protuberant pattern running along the intended filtrate flow path.

9. The filtrate vat according to claim 7, wherein the vat topography comprises a plurality of recesses for receiving a corresponding grid topography of an associated grid comprising a plurality of protuberances, and wherein the plurality of recesses forms a recessed pattern running along the intended filtrate flow path.

10. The filtrate vat according to claim 7 wherein the vat body is of a generally rectangular shape having opposing parallel flanks sides running along a longitudinal direction of the vat, and opposing parallel end sides, such that the flank sides are perpendicular to the end sides, wherein the filtrate outlet is provided at a corner region between adjacent flank and end sides, and wherein the vat topographical pattern runs parallel with the flank sides in between the feed region and the filtrate outlet.

11. The filtrate vat according to claim 7 wherein the vat topographical pattern runs inclined to the flank sides at the feed region of the vat surface.

12. The filtrate vat according to claim 10 wherein the vat topographical pattern runs inclined to the flank sides at a corner region having an outlet.

13. The filtrate vat according to claim 7 wherein the vat is provided as a vat liner having a material thickness of less than 15 mm.

14. A filtrate vat assembly for a vertical filter press comprising:

a grid comprising a grid body having a first side and an opposing second side, wherein the first side defines a generally planar first surface for supporting a filter cloth, when in use, wherein the second side defines a second surface comprising a plurality of protruding knobs spaced apart from each other for supporting the remaining grid on an associated filtrate vat at a distance therefrom, wherein the body further comprises a plurality of apertures providing fluid communication between the first surface and the second surface, wherein the second surface comprises a grid topography for engaging with a corresponding, inverted vat topography of an associated filtrate vat, and wherein the grid topography forms a topographical pattern running along an intended filtrate flow path of an associated filtrate vat at the position of the grid; and a filtrate vat comprising a plate side with a bottom surface at which the filtrate vat is supportable on a filter plate, and a grid side opposite to the plate side, having arranged thereon:

a vat surface defining a bottom of a receptacle for receiving filtrate attainable from a filtration process of an associated vertical filter press and for receiving an associated grid to be supported thereon, and at least partly surrounding the vat surface, a border defining a lateral wall of the receptacle, wherein the vat comprises a filtrate outlet opening for providing a discharge route for filtrate from the filtrate vat, through the border, wherein the vat surface comprises a vat topography for engaging with a corresponding, inverted grid topography of an associated grid, and wherein the vat topography forms a topographical pattern running along an intended filtrate flow path between a feed region of the vat surface and the filtrate outlet opening, wherein the grid is received within the receptacle of the vat such that the second surface of the grid is facing and supported by the vat surface of the filtrate vat, and such that the grid is laterally delimited by the border, and wherein the grid topography and the vat topography mutually engage each other.

15. The filtrate vat assembly according to claim 14, wherein the filtrate vat includes the vat body is of a generally rectangular shape having opposing parallel flanks sides running along a longitudinal direction of the vat, and opposing parallel end sides, such that the flank sides are perpendicular to the end sides, wherein the filtrate outlet is provided at a corner region between adjacent flank and end sides, and wherein the vat topographical pattern runs parallel with the flank sides in between the feed region and the filtrate outlet, and wherein at least a grid including the grid topographical pattern extending between opposing lateral sides of the grid, preferably along a linear path is provided in between the feed region and the filtrate outlet.

16. The filtrate vat assembly according to claim 14, wherein the filtrate vat is a filtrate vat wherein the vat topographical pattern runs inclined to the flank sides at the feed region of the vat surface, and wherein at least a grid wherein the grid topographical pattern extends between adjacent lateral sides of the grid, preferably along a curved path is provided at the feed region.

17. The filtrate vat assembly according to claim 14, wherein the filtrate vat topographical pattern runs inclined to the flank sides at a corner region having an outlet, and wherein at least a grid with a grid topographical pattern that extends between adjacent lateral sides of the grid, preferably along a curved path is provided at the corner region having an outlet.

18. A vertical filter press comprising:

a plurality of superimposed filter plates, wherein the superimposed filter plates are configured movable in a vertical direction away from each to an open position and towards each other to a closed position, such that a horizontal filter chamber is formed between adjacent filter plate assemblies in the closed position;

a filter medium arranged between adjacent filter plates;

a lifting device for lifting the filter plate assemblies away from each other and lowering the filter plate assemblies towards each other;

a sealing device for pressing the plurality of filter plate assemblies in the closed position against each other, so as to seal the filter chamber formed therebetween;

a feed arrangement for feeding slurry into the filter chamber;

a recovering arrangement for recovering filtrate from the filtrate outlets, and a discharge arrangement for moving the filter medium so as to discharge filter cakes formed within the filter chamber, wherein a filtrate vat assembly according to claim 10 is provided on, and supported by, one or more of the filter plates, wherein a filter medium residing between a filter plate above and a filter plate below lies on a grid of a filtrate vat assembly supported by the filter plate below, and wherein, during operation, the filtrate vat assembly of the filter plate below is configured to receive filtrate from an associated filter chamber through the filter medium.

\* \* \* \* \*